United States Patent Office 2,820,818
Patented Jan. 21, 1958

2,820,818

PREPARATION OF SALTS OF HYDROXY ALIPHATIC SULFONIC ACIDS

Arthur R. Sexton and Edgar C. Britton, Midland, Mich., assignors to The Dow Chemical Company, Midland, Mich., a corporation of Delaware No Drawing. Application April 12, 1954
Serial No. 422,664

17 Claims. (Cl. 260—513)

This invention relates to the preparation of salts of hydroxy aliphatic sulfonic acids. It pertains especially to an improved method for the preparation of alkali salts of hydroxy aliphatic sulfonic acids from epoxy aliphatic compounds, sulfur dioxide and alkalies. The epoxy aliphatic compounds particularly dealt with herein are the epoxyalkanes in which the epoxy oxygen atom is a bridge between adjacent carbon atoms in a carbon chain of the molecule, i. e. olefin oxides, and derivatives of such epoxyalkanes in which the only substituent that is chemically reactive under the reaction conditions employed is the epoxy group, e. g. epoxyalkanes substituted by halo, hydroxyl, or alkoxyl radicals, especially such epoxy aliphatic compounds having from 2 to 4 carbon atoms in the molecule.

Sodium isethionate, i. e. the sodium salt of 2-hydroxyethansulfonic acid, is conventionally prepared by reacting ethylene oxide with sodium bisulfite in aqueous solution. This process is commercially disadvantageous for several reasons. Excessive proportions of ethylene oxide are required in order to reduce the concentration of unreacted sodium bisulfite in the sodium isethionate product to an acceptable level. The excess of ethylene oxide, at least in part, is hydrolyzed to ethylene glycol and condensed to polyethylene glycols. Commercially available sodium bisulfite contains appreciable proportions of sodium sulfate and/or bisulfate giving rise to such contaminating salts in the sodium isethionate product. It is customary to remove the sulfate salts from a solution of the product by addition of barium hydroxide and separation of barium sulfate.

An object of this invention is to provide an improved method for the preparation of salts of hydroxy aliphatic sulfonic acids.

A particular object is to provide such a method for the preparation of salts of hydroxy aliphatic sulfonic acids from epoxy aliphatic compounds, sulfur dioxide and alkalies.

A further object is to provide such a method whereby better yields of the desired product can be obtained from the starting materials used.

A specific object is to provide an improved method for the efficient preparation of alkali salts of isethionic acid and homologues thereof substantially free from alkali salts of sulfurous acid and of sulfuric acid.

Other objects and advantages will be apparent from the following description of the invention.

The objects of this invention are attained in an improved process which comprises the steps of adding sulfur dioxide to an aqueous solution of an alkali until the pH value of the solution, measured at room temperature, i. e. at about 25° C., is between 4.5 and about 8, thereafter adding an epoxy aliphatic compound and a further amount of sulfur dioxide to the aqueous solution under reaction conditions and in such manner as to maintain the pH of the solution between 4.5 and about 8 until substantially one molecular proportion of sulfur dioxide has been added per molecular proportion of alkali originally charged to the solution, and continuing the addition of the epoxy aliphatic compound until the alkali salt of sulfurous acid has been substantially consumed in the reaction mixture. Such a condition is usually attained when the quantity of added epoxy aliphatic compound corresponds to about one chemical equivalent, or a minor excess thereover, e. g. from about 1 to about 1.2 molecular proportions, per molecular proportion of sulfur dioxide charged to the solution.

Any alkali whose sulfite and bisulfite salts are water-soluble can be employed in making salts of hydroxy aliphatic sulfonic acids by this method. Suitable alkalies include the alkali metal hydroxides, carbonates and bicarbonates such as lithium hydroxide, sodium hydroxide, potassium hydroxide, rubidium hydroxide and caesium hydroxide, ammonium hydroxide, the corresponding carbonates and bicarbonates and water solutions of organic basic amino compounds.

Any hydroxy aliphatic sulfonic acid salt which can be prepared by reaction of an epoxy aliphatic compound with a sulfite salt in aqueous solution can be prepared by the present method. The invention is particularly applicable to the preparation of salts of hydroxy aliphatic sulfonic acids having from 2 to 4 carbon atoms in the hydroxy aliphatic sulfonic acid molecule. For this purpose, there are employed the already known epoxy aliphatic compounds having from 2 to 4 carbon atoms in the molecule, particularly the olefin oxides and derivatives thereof having only non-reactive substituents, i. e. epoxy compounds wherein only the epoxy linkage is chemically reactive under the reaction conditions employed in the process, whereby the epoxy aliphatic compounds are converted to hydroxy aliphatic sulfonic acids. Representative examples of such epoxy aliphatic compounds are: ethylene oxide (epoxyethane), propylene oxide (1,2-epoxypropane), butylene oxide (1,2-and/or 2,3-epoxybutane), isobutylene oxide (1,2-epoxy-2-methylpropane), epibromohydrin (3-bromo-1,2-epoxypropane), epichlorohydrin (3-chloro-1,2-epoxypropane), glycidol (2,3-epoxy-1-propanol), 1-bromo-2,3-epoxybutane, 1-chloro-2,3-epoxybutane, 3-bromo-1,2-epoxybutane, 3-chloro-1,2-epoxybutane, 1-chloro-2,3-epoxy-2-methylpropane, 1-chloro-2-(chloromethyl)-2,3-epoxypropane, and 1,2-epoxy-3-methoxypropane. Representative examples of salts of hydroxy aliphatic sulfonic acids which can be made by the method of this invention are: sodium isethionate (sodium 2-hydroxyethanesulfonate), sodium 1-(or 2-) hydroxy-2-(or 1-) propanesulfonate, sodium 1-(or 2-) hydroxy-2-(or 1-) butanesulfonate, sodium 2-hydroxy-3-butanesulfonate, sodium 1-(or 2-) hydroxy-2-methyl-2-(or 1-) propanesulfonate, and sodium 3-chloro-1-(or 2-) hydroxy-2-(or 1-) propanesulfonate. It may be pointed out that the opening of an unsymmetrical epoxide ring can give rise to either or both of two isomeric hydroxy aliphatic sulfonates and that the normal reaction product can be a mixture of the corresponding isomers.

In practicing the invention, sulfur dioxide is first added to an aqueous solution of the selected alkali. The concentration of alkali in the solution is not particularly critical. When the hydroxy aliphatic sulfonate product is to be isolated as a dry salt, it is usually desirable to carry out the reaction in as concentrated a solution as convenience will permit in order to minimize the amount of water which must later be evaporated. Usually, a concentration of from about 10 to about 30 percent by weight of alkali in the aqueous solution is employed, although more or less concentrated solutions can be used.

The sulfur dioxide, usually in the form of a gas, is added to the aqueous alkali solution until the pH value of the solution, as measured at room temperature, i. e. at about 25° C., is below 8, preferably approaching 5, and not below 4.5. To attain this condition with a strong alkali starting material such as sodium hydroxide or potassium hydroxide, there is usually required slightly more than one-half molecular proportion of sulfur dioxide per molecular proportion of alkali. Under these conditions, the original alkali starting material is substantially converted to salts of sulfurous acid, predominately the alkali sulfite with an appreciable proportion of alkali bisulfite. By keeping the pH of the solution above 4.5, the concentration of sulfurous acid in the solution is negligible. It is important that the pH value of the solution, as measured at a temperature of about 25° C., not be allowed to go below 4.5. It has now been discovered that bisulfite solutions having pH values even slightly below 4.5 require excessive proportions of olefin oxide, e. g. ethylene oxide, in order to consume the bisulfite. Concurrently, excessive proportions of by-products are formed. The formation of undersired by-products is substantially avoided, and the proportion of olefin oxide necessary to consume the bisulfite is more nearly theoretical, when the reaction is carried out in mixtures having pH values between 4.5 and 8. Because of the exceptional criticality of the lower pH limit, and to avoid operation at pH values below 4.5, it is preferable to operate at pH values well above 4.5, e. g. at pH values between 5 and 8. At pH values above about 8, the reaction mixtures contain disadvantageously low concentrations of alkali bisulfite. The addition of olefin oxide under these strongly alkaline conditions likewise leads to the formation of by-products and excessive consumption of olefin oxide, although not to the same extreme degree as does operation of pH values below 4.5.

To the aqueous solution of alkali salts of sulfurous acid, prepared as hereinbefore described and having a pH value between 4.5 and 8, preferably between 5 and 8, is then added an epoxy aliphatic compound. During the addition of the epoxy aliphatic compound to the reaction mixture, the addition of sulfur dioxide may be continued or may be discontinued. If the flow of sulfur dioxide is discontinued during the addition of the epoxy aliphatic compound to the reaction mixture, the reaction causes a rise in the pH value of the reaction mixture as the alkali bisulfite is converted to alkali hydroxy aliphatic sulfonate. When, under such conditions, the pH value of the reaction mixture approaches 8, the addition of sulfur dioxide is resumed, with or without interruption of the addition of the epoxy aliphatic compound, to reduce the pH value of the mixture to about 5, but not below 4.5, preferably so as to maintain the pH of the mixture between 5 and 8. If the addition of the epoxy aliphatic compound and sulfur dioxide is concurrent, the relative rates of addition thereof should be so controlled that the pH value of the reaction mixture is maintained above 4.5, preferably values between 5 and about 8. The points of concurrent entry of the epoxy aliphatic compound and sulfur dioxide into the reaction mixture should be so separated that the sulfur dioxide is completely dissolved before contacting the epoxy aliphatic compound and so that the latter contacts only a solution having a pH value between 5 and about 8.

The temperature and pressure maintained during the reaction are not critical. The reaction is sluggish at low temperatures. Excessive proportions of glycol are formed at high temperatures. Usually the reaction is carried out at a reaction temperature between about 25° and about 90° C., preferably between 40° and 70° C. The reaction is conveniently carried out at atmospheric pressure, although higher or lower pressures can be used.

The concurrent or sequential addition of the epoxy aliphatic compound and sulfur dioxide to the reaction mixture at pH values between 5 and about 8 is continued until approximately one molecular proportion of sulfur dioxide has been added per one molecular proportion of alkali originally charged to the reaction mixture. The addition of sulfur dioxide is then stopped. Usually, at such time, less than one molecular proportion of the epoxy aliphatic compound has been added to the reaction mixture. Addition of the epoxy aliphatic compound is continued until the sulfurous acid salts are substantially consumed in the reaction mixture, whereupon the pH value of the mixture usually rises sharply, e. g. to pH 9 or higher, and the reaction can be considered as complete. By such procedure, substantially all of the alkali salts of sulfurous acid can be converted to alkali salt of hydroxy aliphatic sulfonic acid.

The reaction products so obtained are water solutions of alkali hydroxy aliphatic sulfonates. Made by the method of this invention, such products have less by-products such as glycols, less unreacted alkali salts of sulfurous acid, and less alkali sulfate than are usually found in such products made by methods hithertofore known. In order further to minimize the alkali sulfate content in the hydroxy aliphatic sulfonate product and to secure the maximum advantages of this invention it is desirable to employ starting materials which are substantially free of sulfates and sulfate-forming impurities and to protect the starting materials and the reaction mixture, especially mixtures containing sulfurous acid salts, from contact with oxidants, including air. For example, it is advantageous to flush the reaction vessels with an inert gas such as nitrogen and to blanket the reaction mixture with such an inert gas during the course of the reaction.

The alkali hydroxy aliphatic sulfonates can be utilized in the form of their solutions as produced or the solutions can be diluted or concentrated. The dry alkali hydroxy aliphatic sulfonate salts can be obtained from the reaction product solution by evaporation of the water therein, by heating, under reduced pressure if desired. Like the solutions, the dry alkali hydroxy aliphatic sulfonate salts have less contaminating impurities than are usually present in such products as made by previously known methods. Treatment with barium hydroxide is not necessary to obtain substantially sulfate-free products by the method of this invention.

Moreover, the yield of alkali hydroxy aliphatic sulfonates is better by this improved method, particularly in regard to the epoxy aliphatic compound starting material.

It is evident that the invention can be modified in obvious ways and adapted to operation in batchwise, semi-continuous or continuous manner.

The following examples illustrate the invention but are not to be construed as limiting its scope. Throughout the examples, the pH values were measured on sample portions of the tested material at a temperature of about 25° C.

*Example 1*

Into a reactor equipped with a stirrer, thermometer, pH electrodes, and a reflux condenser refrigerated for reflux of sulfur dioxide and ethylene oxide, was charged 2.0 gram-moles of sodium hydroxide in the form of a 15.2 percent by weight solution in water. Sulfur dioxide was added to the solution, until the pH of the mixture was 5, slightly more than one gram mole of sulfur dioxide being required, whereupon the flow of sulfur dioxide to the solution was stopped. The temperature of the solution was adjusted to about 50° C. and was thereafter maintained between 50° and 70° C. Ethylene oxide was then added to the solution until the pH rose to about 8, whereupon the flow of ethylene oxide was stopped. Alternate additions of sulfur dioxide to pH 5 and of ethylene oxide to pH 8 were made until a total of 2.0 gram-moles of sulfur dioxide had been added. Thereafter ethylene oxide was added to the solution to a pH of 8, there being used a total of 2.05 gram-moles of ethylene oxide, i. e. only 2.5 percent excess over the theoretical amount. The reaction product solution was free from sulfate ion as shown by the absence of any precipitate upon the addition of a solution of barium hydroxide.

Upon drying the reaction product solution, dry sodium isethionate was obtained in a yield which was substantially quantitative in respect to the sodium hydroxide and sulfur dioxide charged and was approximately 97.5 percent of theoretical in respect to the ethylene oxide used. The dry product contained only 0.1 percent by weight sodium sulfite and no sodium sulfate.

In contrast to the above example, in a number of trials ethylene oxide was added to water solutions of commercial sodium bisulfite at 50–70° C. From 15 to 25 mole percent excess ethylene oxide was required substantially to discharge the bisulfite from the reaction mixture. The reaction products contained from 2 to 4 percent by weight sodium sulfate and required careful treatment with barium hydroxide in order to produce an acceptable sulfate-free material. The products also contained appreciable proportions of sodium bisulfite and glycols.

*Example 2*

By a procedure similar to that described in Example 1, sulfur dioxide and propylene oxide, in the place of ethylene oxide, are added to an aqueous solution of sodium hydroxide until one molecular proportion of sulfur dioxide is added per molecular proportion of sodium hydroxide originally charged. The final increment of propylene oxide is just sufficient to raise the pH value of the mixture to 8. The reaction product is a solution of sodium hydroxypropane-sulfonate, presumably a mixture of sodium 1-hydroxy-2-propanesulfonate and sodium 2-hydroxy-1-propanesulfonate, substantially free of sodium sulfate and sodium sulfite.

*Example 3*

By a procedure similar to that described in Example 1, 0.244 pound-mole of sulfur dioxide, 0.290 pound-mole of butylene oxide (a mixture of about 92 percent by weight 1,2-butylene oxide and about 8 percent by weight 2,3-butylene oxide) and 0.244 pound-mole of sodium hydroxide were interreacted in 45 pounds of water at a pH between 5 and 8 and at a temperature between 50° and 70° C. After evaporation of water from the reaction product solution there was obtained 42.5 pounds (0.242 pound-mole) of dry sodium x-hydroxy-x-butanesulfonate (presumably a mixture of the sodium salts of 1-hydroxy-2-butanesulfonic acid, 2-hydroxy-1-butanesulfonic acid and 2-hydroxy-3-butanesulfonic acid) containing the following impurities by analysis, in percent by weight:

| | Percent |
|---|---|
| Sodium bisulfite | 0.04 |
| Sodium sulfate | 0.14 |

In contrast to the preceding example, when 1.25 moles of butylene oxide were reacted with one mole of commercial sodium bisulfite as a 21.5 percent by weight solution in water at 80° C., the dry product (yield, 0.98 mole) contained the following impurities by analysis, in percent by weight:

| | Percent |
|---|---|
| Sodium bisulfite | 1.7 |
| Sodium sulfate | 2.2 |

*Example 4*

By a procedure similar to that described in Example 1, 64 pounds (1 pound-mole) of sulfur dioxide, 56.1 pounds (1 pound-mole) of potassium hydroxide (in place of the sodium hydroxide) and 50 pounds (1.13 pound-moles) of ethylene oxide were inter-reacted in 250 pounds of water at pH values between 5 and 8 and at temperatures between 50° and 70° C. A test portion of the reaction product solution gave no precipitate upon the addition of a solution of barium chloride. After evaporation of water from the reaction product solution, there was obtained one pound-mole of potassium isethionate.

We claim:

1. A method for the preparation of salts of hydroxy aliphatic sulfonic acids which comprises adding sulfur dioxide to an aqueous solution of an alkali until the pH value of the solution is between 4.5 and about 8, and adding an epoxy aliphatic compound having from 2 to 4 carbon atoms in the molecule and a further amount of sulfur dioxide to the aqueous solution under reaction conditions and in a manner so as to maintain the pH value of the solution between 4.5 and about 8 until substantially one molecular proportion of sulfur dioxide is added per molecular proportion of alkali originally charged to the solution and alkali salt of sulfurous acid is substantially consumed in the reaction mixture.

2. A method for the preparation of salts of hydroxy aliphatic sulfonic acids which comprises adding sulfur dioxide to an aqueous solution of an alkali until the pH value of the solution is between 4.5 and about 8, adding an epoxy aliphatic compound having from 2 to 4 carbon atoms in the molecule and selected from the class consisting of olefin oxides and derivatives thereof in which the only reactive group is the epoxy linkage and a further amount of sulfur dioxide to the aqueous solution at a reaction temperature between about 25° and about 90° C. and in a manner so as to maintain the pH value of the solution between 4.5 and about 8 until substantially one molecular proportion of sulfur dioxide is added per molecular proportion of alkali originally charged to the solution and alkali salt of sulfurous acid is substantially consumed in the reaction mixture.

3. A method according to claim 2 wherein the epoxy aliphatic compound is an olefin oxide.

4. A method according to claim 2 wherein the operations are carried out in the substantial absence of molecular oxygen.

5. In a method for the preparation of salts of hydroxy aliphatic sulfonic acids wherein an epoxy aliphatic compound having from 2 to 4 carbon atoms in the molecule is added under reaction conditions to an aqueous solution comprising an alkali bisulfite prepared by adding sulfur dioxide to an aqueous solution of an alkali, the improvement which comprises adding the epoxy aliphatic compound and a further amount of sulfur dioxide in such a manner that the pH value of the aqueous solution is maintained between 4.5 and about 8 during the addition of the epoxy aliphatic compound.

6. A method according to claim 5 wherein the epoxy aliphatic compound is an olefin oxide.

7. A method for the preparation of salts of hydroxy aliphatic sulfonic acids which comprises adding sulfur dioxide to an aqueous solution of an alkali metal hydroxide until the pH value of the solution is between 4.5 and about 8, adding an olefin oxide having from 2 to 4 carbon atoms in the molecule and a further amount of sulfur dioxide to the aqueous solution at a reaction temperature between about 40° and about 70° C. in relative proportions and in such a manner as to maintain the pH value of the solution between 4.5 and about 8 until substantially one molecular proportion of sulfur dioxide is added per molecular proportion of alkali metal hydroxide originally charged to the solution and continuing the addition of olefin oxide until alkali salt of sulfurous acid is substantially consumed in the reaction mixture.

8. A method according to claim 7 wherein the olefin oxide is ethylene oxide.

9. A method according to claim 7 wherein the olefin oxide is propylene oxide.

10. A method according to claim 7 wherein the olefin oxide is a butylene oxide.

11. A method according to claim 7 wherein the additions to the reaction mixture of olefin oxide and of sulfur dioxide are discontinuous, the addition of each being interrupted during the addition of the other.

12. A method according to claim 11 wherein the alkali metal hydroxide is sodium hydroxide.

13. A method according to claim 12 wherein the olefin oxide is ethylene oxide.

14. A method according to claim 12 wherein the olefin oxide is propylene oxide.

15. A method according to claim 12 wherein the olefin oxide is a butylene oxide.

16. A method for the preparation of sodium isethionate which comprises adding sulfur dioxide to an aqueous solution of sodium hydroxide until the pH value of the solution is between 4.5 and about 8, adding ethylene oxide and a further amount of sulfur dioxide to the aqueous solution at a reaction temperature between about 40° and about 70° C. in relative proportions and in such a manner as to maintain the pH value of the solution between 4.5 and about 8, continuing the addition of sulfur dioxide until substantially one molecular proportion of sulfur dioxide is added per molecular proportion of sodium hydroxide originally charged to the solution, continuing the addition of ethylene oxide until the sodium salt of sulfurous acid is substantially consumed in the reaction mixture, carrying out the foregoing operations in the substantial absence of molecular oxygen, and heating the resulting solution to evaporate water therefrom and to obtain substantially dry sodium isethionate.

17. A method for the preparation of potassium isethionate which comprises adding sulfur dioxide to an aqueous solution of potassium hydroxide until the pH value of the solution is between 4.5 and about 8, adding ethylene oxide and a further amount of sulfur dioxide to the aqueous solution at a reaction temperature between about 40° and about 70° C. in relative proportions and in such a manner as to maintain the pH value of the solution between 4.5 and about 8, continuing the addition of sulfur dioxide until substantially one molecular proportion of sulfur dioxide is added per molecular proportion of potassium hydroxide originally charged to the solution, continuing the addition of ethylene oxide until the potassium salt of sulfurous acid is substantially consumed in the reaction mixture, carrying out the foregoing operations in the substantial absence of molecular oxygen, and heating the resulting solution to evaporate water therefrom and to obtain substantially dry potassium isethionate.

References Cited in the file of this patent

UNITED STATES PATENTS 2,653,970    Fessler _____ Sept. 29, 1953

OTHER REFERENCES

Bronsted et al.: J. Amer. Chem. Soc. 51: 428, 429, 440 (1929).

Rumpf: Bull. Soc. Chim. (1938), p. 879.

Rumpf: Chem. Abst., vol. 32, p. 6622 (1938).

Groggins: Unit Processes in Organic Synthesis (4th edit.), p. 294 (1952).